United States Patent [19]
Hashiba

[11] Patent Number: 5,630,617
[45] Date of Patent: May 20, 1997

[54] HORN PAD FOR A STEERING WHEEL

[75] Inventor: Takahiro Hashiba, Aichi-ken, Japan

[73] Assignees: Toyoda Gosei Co., Ltd., Aichi-ken, Japan; TG North America Corporation, Troy, Mich.

[21] Appl. No.: 581,837

[22] Filed: Jan. 2, 1996

[51] Int. Cl.[6] ................................. B60R 21/16
[52] U.S. Cl. ............... 280/731; 280/728.3; 200/61.54
[58] Field of Search ......................... 280/728.2, 728.3, 280/731; 200/61.54, 61.55, 61.56, 61.57

[56] References Cited

U.S. PATENT DOCUMENTS

| | | | |
|---|---|---|---|
| 5,265,904 | 11/1993 | Shelton et al. | 280/731 |
| 5,308,106 | 5/1994 | Heidorn | 200/61.54 |
| 5,338,059 | 8/1994 | Inoue et al. | 280/731 |
| 5,399,819 | 3/1995 | Lang et al. | 280/731 |
| 5,413,376 | 5/1995 | Filion et al. | 280/731 |

Primary Examiner—Paul N. Dickson
Attorney, Agent, or Firm—Cushman Darby & Cushman IP Group of Pillsbury Madison & Sutro LLP

[57] ABSTRACT

A horn pad for a steering wheel incorporating an air bag device. The horn pad comprises a pad main body, a planar switch opposed to a lower side of a horn operating portion and a support plate. A plurality of pressing protrusions are formed on the lower surface of the horn operating portion. The support plate is urged upwardly by the air bag and comprises a first support plate and a second support plate separatable from each other. Work preventive protrusions are formed passing through the planar switch and the first support plate between the second support plate and a lower surface of the horn operating portion such that a non-press-contact state can be maintained between the pressing protrusion and the planar switch when the horn operating portion bears no load. Accordingly, even if the support plate should be urged upwardly by an air bag or the like, this will not cause erroneous operation of the planar switch and, in addition, the thickness of the support plate can be made as thin as possible.

13 Claims, 5 Drawing Sheets

HORN PAD FOR A STEERING WHEEL

BACKGROUND OF THE INVENTION

1. Field of the Invention

The present invention relates to a steering wheel pad for use in vehicles and, more specifically, to a pad having a planar switch and a support plate having a rigidity sufficient for supporting the switch.

2. Description of Related Art

A steering wheel pad having a planar switch of the above-mentioned type has been known as described, for example, in Japanese Patent Laid-Open Hei 6-305425.

The conventional steering wheel pad comprises a pad main body (outer cover), a planar switch, and a support plate having a rigidity sufficient to support the switch. A plurality of attaching holes (engaging holes) are formed in the periphery of the support plate passing vertically therethrough, and attaching ribs (engaging legs) for engaging the periphery of the attaching holes of the support plate are formed on the rear face of the pad main body.

However, it has been found that the pad of the above-mentioned structure causes the following problems.

That is, when the support plate of the horn pad is urged upwardly by an air bag of an air bag device, for example, when an air bag folded and contained in the pad main body is loosened or relaxes from its initially assembled state, a gap between pressing protrusions and the planar switch is eliminated even when a horn button bears no load. Thus, the planar switch may make electric contact and thus may operate erroneously.

In view of the above, to maintain a gap between the upper surface of the support plate at a portion inboard of the periphery and the rear face of the pad main body, spacer protrusions are formed on at least one of the rear face corresponding to the periphery of the support plate.

However, there is still a concern that the support plate may distort upwardly in the vicinity of a central portion, thereby inadvertently actuating the planar switch. This drawback may be overcome if the support plate has a sufficient rigidity not to distort due to the urging force of the air bag. However, ensuring sufficient rigidity of the support plate increases the thickness of the support plate considerably, which is not desirable because this conflicts with the demand of reduced weight and compact structure of the horn pad.

SUMMARY OF THE INVENTION

It is, accordingly, an object of the present invention to provide a pad for a steering wheel free from the concern of the possibility of erroneous operation of a planar switch even when the support plate is urged upwardly, and having a support plate made as thin as possible.

The foregoing object of the present invention can be attained in a horn pad for a steering wheel comprising a pad main body, a planar switch, and a support plate for supporting the switch, wherein a plurality of pressing protrusions formed to the lower surface of the horn operating portion, wherein the support plate comprises an upper first support plate and a lower second support plate separable from each other and one or more work preventive protrusions are formed passing through the planar switch and the support plate between the second support plate and the lower surface of the horn operating portion, such that a non- press-contact state can be maintained between the pressing protrusions and the planar switch when the horn operating portion bears no load.

DETAILED DESCRIPTION OF THE INVENTION

The present invention will be explained by way of preferred embodiments with reference to the drawings. As shown in FIG. 1 to FIG. 4, explanation will be made to an example of a horn-pad of a separated type. However, the present invention is applicable also to a wheel pad integrally molded with a core cover portion.

Figure 1:
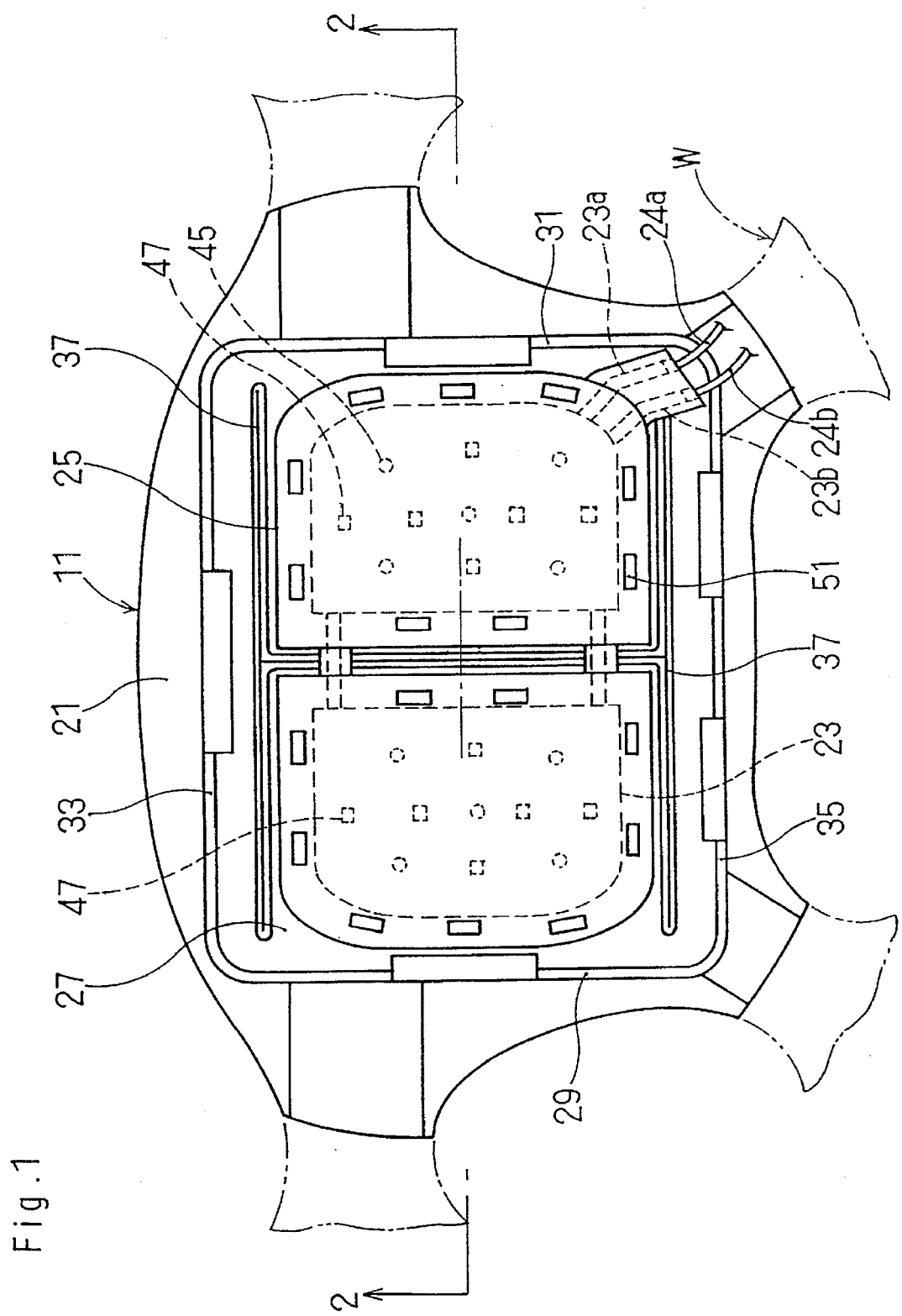
FIG. 1 is a bottom view of a steering wheel pad illustrating a preferred embodiment of the present invention.
Figure 2:
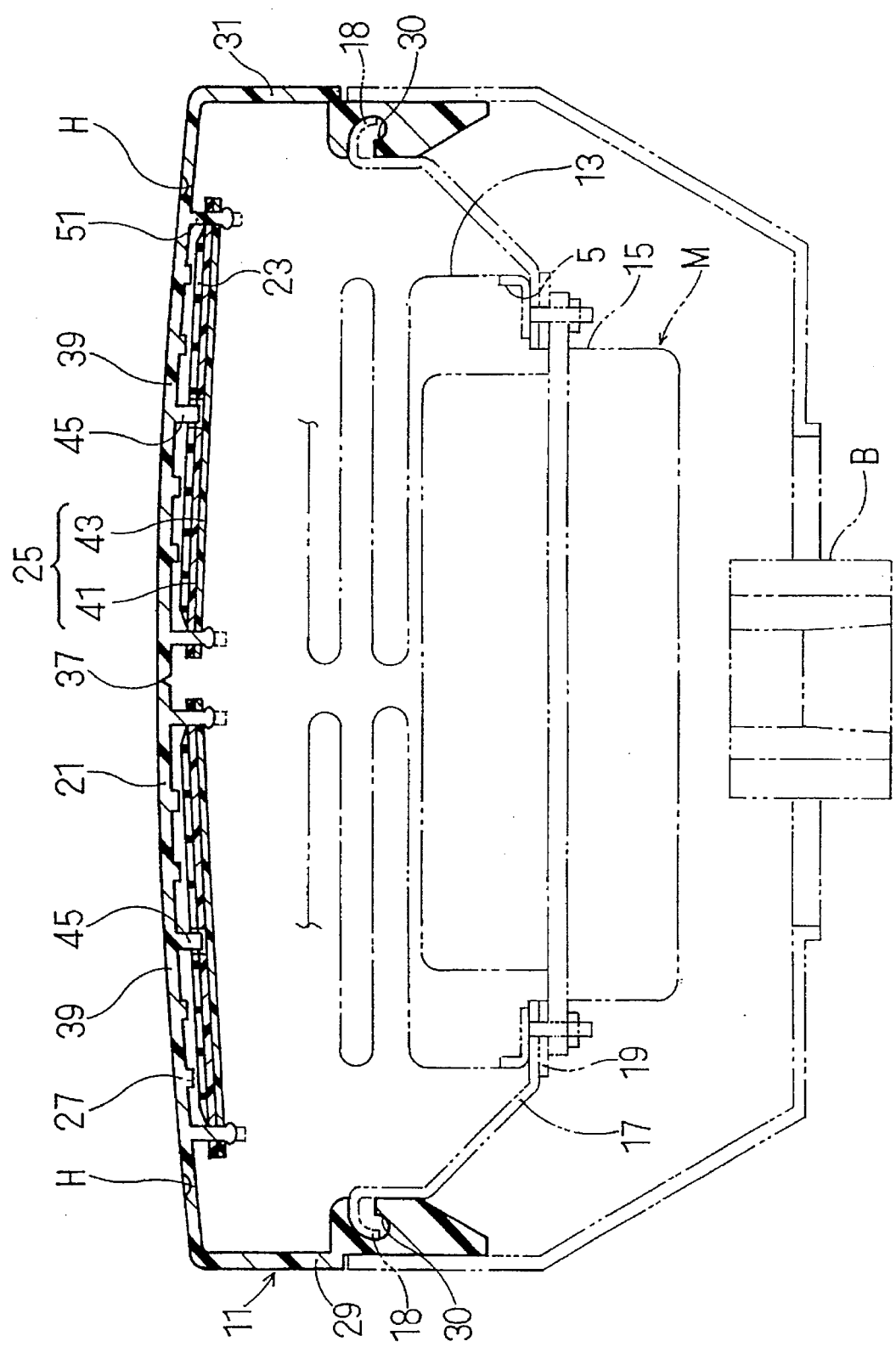
FIG. 2 is a schematic, cross sectional view taking along a line 2—2 in FIG. 1.

As shown in FIGS. 1 & 2 a horn pad (hereinafter referred to simply as "pad") 11 in this embodiment is disposed above a boss B at a center of a steering wheel W. The pad also serves as a cover for surrounding an upper surface of an air bag 13 of an air bag device M.

The air bag device M comprises an air bag 13 contained in a folded state and expandable under a predetermined condition, an inflator 15 for supplying a gas to the air bag 13 and a pad 11 surround the periphery of the air bag 13, which are constituted as a modular structure by a backup plate 17 and a holder plate 19.

The pad 11 has a basic constitution comprising a pad main body 21, a generally planar membrane switch 23 and a support plate 25 for supporting the switch 23.

The pad main body 21 has an upper wall 27 and four side walls 29, 31, 33 and 35 extending downwardly from the lower surface of the upper wall 27 defining the peripheral edge of the main body 21. The pad main body 21 is molded, for example, by injection molding from a thermoplastic elastomer material such as polyolefin, polyester, polystyrene or polyvinyl chloride.

When molding a pad main body 121 (FIG. 4) with a soft RIM (Reaction Injection Molding) urethane material, since no sufficient shape retainability can be obtained only with the soft Reaction Injection Molding (RIM) urethane, a dual layer molding is adopted so as to form the inside of the pad main body with an insert 122 having engaging legs 51 and pressing protrusions, or ridges 147 formed on the lower surface for holding the support plate.

With reference to FIG. 1, a thin wall weakened portion or easily breaking portion 37 is disposed in a substantially sideway H-shaped configuration, in a plan view, above the upper wall 27.

A horn operating portion 39 of the upper wall 27 is provided for operating the planar switch 23, and has a plurality of pressing protrusions 47 such that the planar switch 23 can be actuated when any of portion of the operating portion 39 is manually pressed. The upper wall 27 also has a groove formed therein difining a hinge portion H such that the portion 39 can distort easily upon hand pressing, thereby enabling the pressing protrusions 47 to be in contact with the planar switch 23. The hinge portion H may be formed also by reducing the thickness of the horn operating portion 39 in other portions of the upper wall 27.

In the illustrated embodiment, the horn operating portion 39, the planar switch 23 and the support plate 25 are formed on both sides of a center line C of the braking portion 37.

Figure 3:
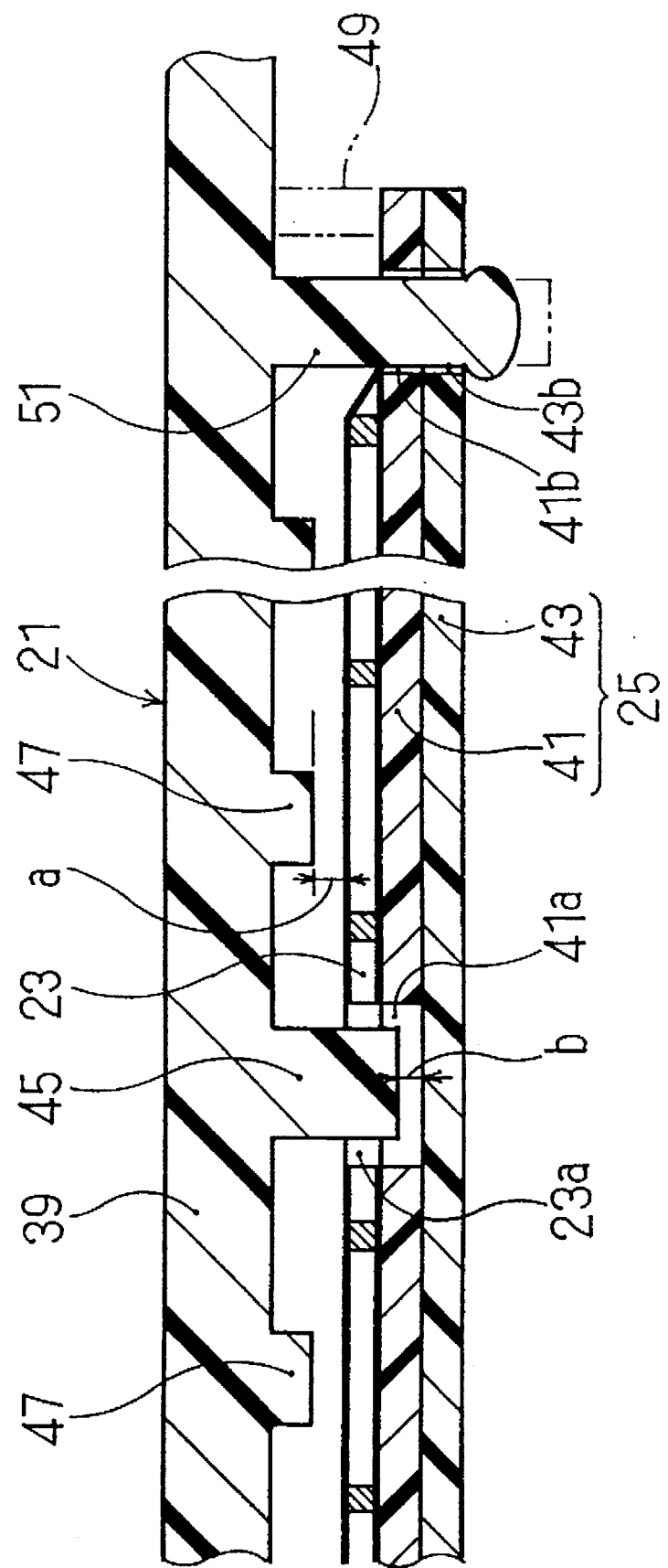
FIG. 3 is an enlarged, partially cut away cross-sectional view illustrating another embodiment of the present invention.

The planar switch 23 is constituted as a membrane switch in the illustrated embodiment but its configuration is not restricted only thereto. The switch 23 has lead terminals 23a and 23b (FIG. 3). The lead terminals 23a and 23b are connected by solder-connected lead wires 24a and 24b to positive and negative sides of a horn actuating circuit of a vehicle.

In the constitution described above, the support plate 25 comprises an upper or first support plate 41 and a lower or second support plate 43 separatable from each other. One or more work preventive protrusions 45 are formed penetrating the planar switch 23 and the first support plate 41 between the second support plate 43 and the lower surface of the horn operating portion 39, to a non-contact state between the pressing protrusions 47 and the planar switch 23 when the horn operating portion 39 bears no load.

Specifically, the work preventive protrusions 45 are distributed in the illustrated embodiment such that in protrusion 45 is disposed between pressing protrusions 47 of the horn operating portion 39. The protrusions 45 are disposed such that five protrusions 45 are on left and right areas, respectively. Through holes 23a and 41a for the work preventive protrusions are formed through the planar switch 23 and the first support plate 41 corresponding to a plurality of the work preventive protrusions 45.

For reliably maintaining the non press-contact state between the pressing protrusions 47 and the planar switch 23 when the horn operating portion 39 bears no load, a designed gap a between the planar switch 23 and the pressing protrusion 47 is made greater than a designed gap b between the work preventive protrusion 45 and the second support plate 43, that is, $0 \leq b < a$, in a case where the work preventive protrusion 45 is protruded from the pad main body 21 as shown in FIG. 3. Usually the value of a is designed as $a=0.5$ to 2 mm.

Figure 4:
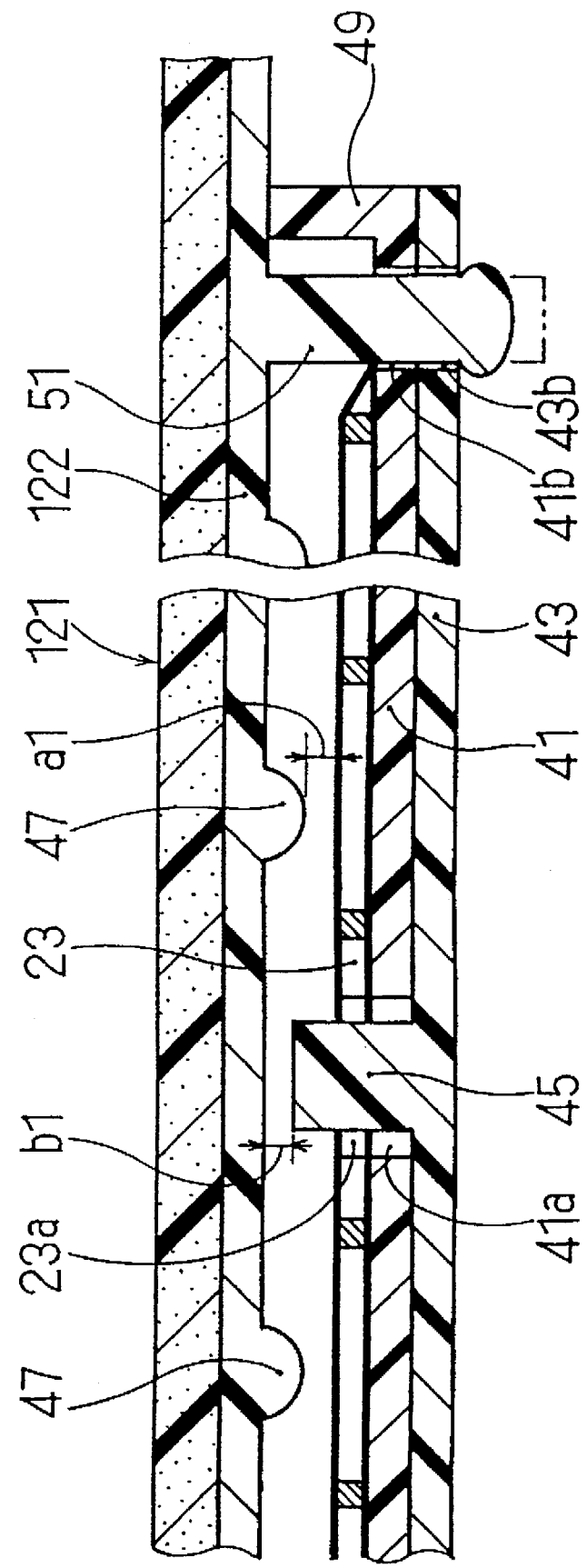
FIG. 4 is an enlarged, partially cut away cross-sectional view illustrating a further embodiment of the present invention.

As shown in FIG. 4, in a case where the work preventive protrusion 45 is protruded from the second support plate 43, the designed gap a1 between the planar switch 23 and the pressing protrusion 47 is made greater than the designed gap b1 between the work preventive protrusion 45 and the rear face of a pad main body 121.

The work preventive protrusions 45 also have an effect capable of adjusting a load on the horn by adjusting the length and the number of protrusions 45.

Although not always necessary, spacer protrusions 49 may be formed on the rear face of the horn operating portion 39 along the periphery corresponding to the periphery of the second support plate 43 as shown in FIG. 3, for reliably maintaining the designed gap between the planar switch 23 and the rear face of the horn operating portion 39. As shown in FIG. 4, the spacer protrusions 49 may be formed on the periphery of the first support plate 43 or they may be formed also to both of the second support plate 43 and the rear face of the horn operating portion 39.

In this case, it may suffice for the first support plate 41 to have a minimum rigidity for operating the planar switch 23 without escaping the pressing force of the pressing protrusion 47 (shape retainability) and the shape retainability of the second support plate 43 may be smaller than that of the first support plate 41, so that they can be made as thin as possible. The thickness of each of the support plates is 1 mm for the first support plate and 0.5 mm for the second support plate, when made, for example, of polycarbonate or polyacetal material.

For attaching the first and the second support plates 41 and 43 to the horn pad main body 21, a plurality of downwardly extending engaging legs 51 are protruded, being spaced by a predetermined interval from each other, to the outboard of the periphery of the horn operating portion 39 as shown in FIG. 3. Each leg 51 engages holes 41b and 43b, formed in the first and the second support plates 41 and 43 corresponding to the engaging legs 51.

Figure 5:
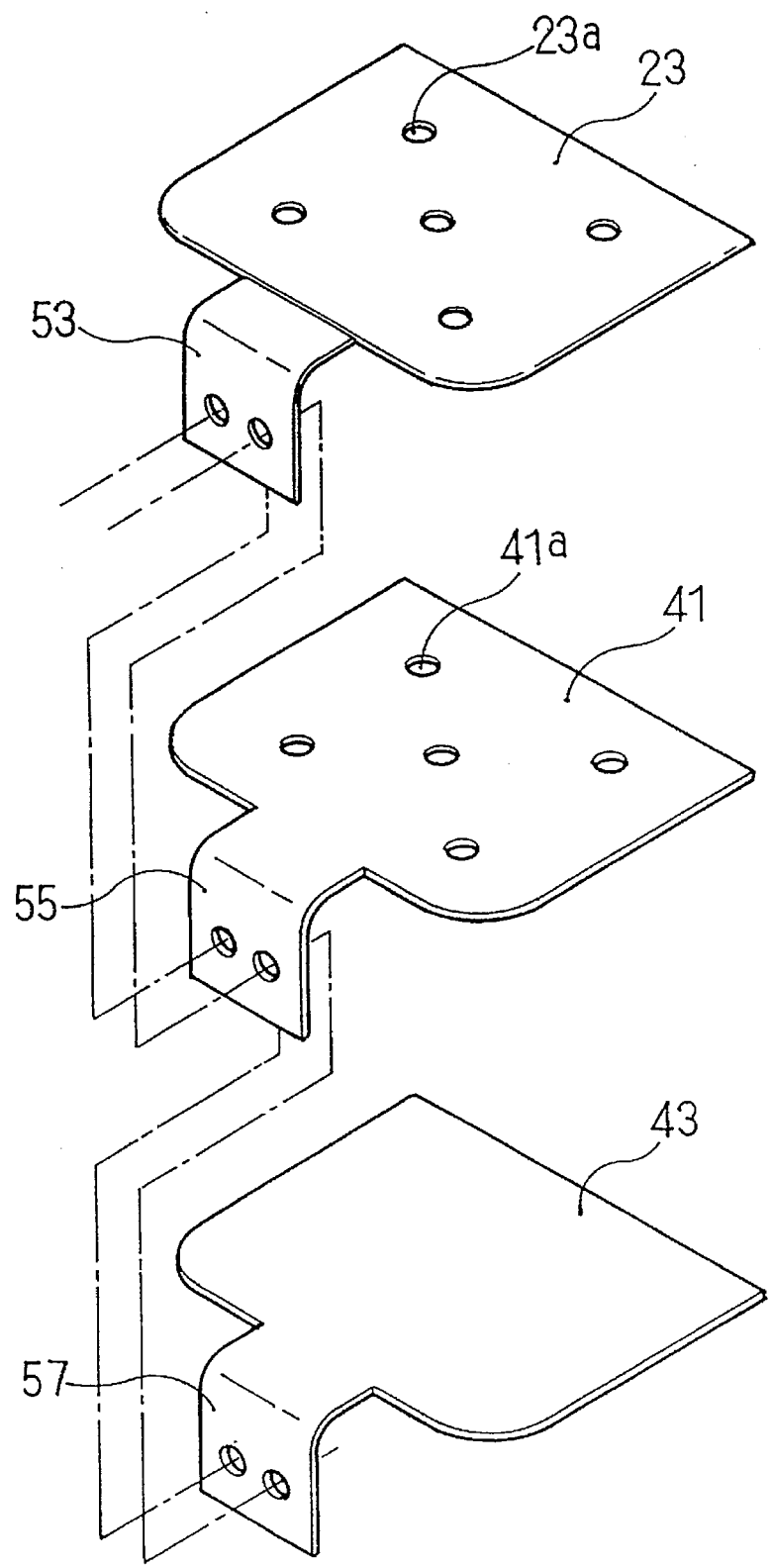
FIG. 5 is an exploded perspective view illustrating a mode of attaching a planar switch in the present invention.

The mode of attaching the planar switch is not restricted only to the above mode but, as shown in FIG. 5, attaching arms 53, 55 and 57 may be extended from the circumferential edges of the corresponding planar switch 23, and the first and the second support plates 41 and 43. Each of the attaching arms 53, 55 and 57 is clamped together by means of rivets or bolts to the inner circumferential wall of the pad main body 21.

Alternatively, the first support plate 41 may be integrated with the planar switch 23 to constitute a portion of the planar switch 23. This desirably reduces the number of parts and reduce the number assembling steps.

Assembling of the horn pad 11 of this embodiment will be explained.

At first, the horn pad 11 is upturned, to which the planar switch 23, and the first and the second support plates 41 and 43 are stacked successively. Then, respective engaging holes 41b and 43b are brought into a state of fitting the engaging legs 51 of the pad main body upper wall 27.

Subsequently, the portions for each of the engaging legs 51 protruding from each of the engaging holes 41b and 43b are heat melted and crushed such that they can engage the periphery of the respective engaging holes 41b and 43b, and then they are thermally caulked, to join the first and the second support plates 41 and 43 and the planar switch 21 to the pad main body 21 to thereby assemble the horn pad 11.

Then, the horn pad 11 is assembled to the air bag inflator modules 13 and 15, for example, by retaining a hook 18 (FIG. 1) protruded from the side wall of the backup plate 17 into a recessed groove 30 formed in each of the side walls 29, 31, 33 and 35 of the pad main body 21, respectively.

Then, the air bag device M is secured to a portion of a steering wheel core by utilizing nuts or the like (not illustrated) of the backup plate 17. The lead wires 24a and 24b are connected to the positive and the negative sides of the horn actuation circuit of the vehicle to assemble the steering wheel W, by which they can be mounted to a vehicle.

Then, in the pad 11 of this embodiment, when the horn operating portion 39 of the upper wall 27 of the pad main body is pressed so as to actuate the horn, the work preventive protrusions 45 press the second support plate 43 downwardly, whereby the pressing protrusions 47 move downwardly by a stroke relatively greater than that of the protrusion 45 due to the distortion of the horn operating portion 39 by way of the hinge portion H. This causes the pressing protrusions 47 and the planar switch 23 to be brought into a press contact state with each other, thereby making the switch 23 conductive and sounding the horn.

If the second support plate 43 is urged upwardly by the air bag 13, for example, by loosening or relaxing from its folded state, the rear face of the pad main body 21 is raised upwardly corresponding to the urging force of the air bag 13 to each of the portions due to the presence of the work preventive protrusions 45, so that the gap between the second support plate 43 and the horn operating portion 39 is not substantially made shorter than the length of the work preventive protrusion 45, this maintains a non-press-contact state between the pressing protrusions 47 and the planar switch 23 when the horn button portion bears no load.

While the invention has been described in connection with what is presently considered to be the most practical and preferred embodiments, it is understood that the invention is not limited to the disclosed embodiment, but, on the contrary, is intended to cover various modification and equivalent arrangements included within the spirit of the appended claims.

What is claimed is:

1. A horn pad for a steering wheel, the steering wheel having an air bag device, the horn pad being constructed and arranged to cover an upper surface of said air bag device, the horn pad comprising:

a main body including a horn operating portion, said horn operating portion having an upper surface and a lower surface, a plurality of pressing protrusions extending from said lower surface of said horn operating portion, a planar switch opposing said pressing protrusions of said horn operating portion so as to define a gap therebetween when said horn operating portion bears no load, said switch being operable upon contact with said protrusions due to a load on said horn operating portion, a support plate constructed and arranged to support said planar switch and including first and second support plates, said first and second support plates being movable relative to each other, at least one work preventive protrusion provided between said lower surface of said horn operating portion and said second support plate so as to define a space, said at least one work preventive protrusion extending through said planar switch and through at least a portion of said first support plate, said at least one work preventive protrusion being constructed and arranged to prevent contact between said pressing protrusions and said planar switch.

2. A horn pad for a steering wheel according to claim 1, wherein a plurality of work preventive protrusions extend from the main body.

3. A horn pad for a steering wheel according to claim 2, wherein said space is between said at least one work preventive protrusion and said second support plate, and the gap between the planar switch and the pressing protrusions is larger than said space.

4. A horn pad for a steering wheel according to claim 1, wherein the work preventive protrusions protrude from the second support plate.

5. A horn pad for a steering wheel according to claim 4, wherein said space is between said at least one work preventive protrusion and said lower surface of said horn operating portion, and the gap between the planar switch and the pressing protrusions is larger than said space.

6. A horn pad for a steering wheel according to claim 1, wherein, the first support plate is integrated with the planar switch to form a portion of said planar switch.

7. A horn pad for a steering wheel according to claim 1, further comprising engaging holes formed in the second support plate, and engaging legs formed on the rear face of the pad main body for engaging with the engaging holes of said support plate.

8. A horn pad for a steering wheel according to claim 1, further comprising attaching arms extending from peripheral edges of the planar switch, first support plate and second support plate, respectively, and each of the attaching arms being clamped together to an inner circumferential wall of the main body.

9. A horn pad for a steering wheel according to claim 1, further comprising spacer protrusions formed at least on one of the periphery of the second support plate and said lower surface of the horn operating portion corresponding to the periphery of the support plate, for controlling a gap between the first support plate and said lower surface of the horn operating portion.

10. A horn pad for a steering wheel according to claim 1, wherein, the pressing protrusions are of convex shape in cross-section.

11. A horn pad for a steering wheel according to claim 1, wherein, the pressing protrusions are of generally rectangular shape in cross-section and are ridges.

12. A horn pad for a steering wheel according to claim 1, wherein the main body is integrally molded from a thermoplastic elastomer.

13. A horn pad for a steering wheel according to claim 1, wherein, the main body is made of RIM urethane material and molded as a dual layered structure inside.

* * * * *